United States Patent
Yang

(10) Patent No.: US 7,199,918 B2
(45) Date of Patent: Apr. 3, 2007

(54) ELECTRICAL CONTACT METHOD AND STRUCTURE FOR DEFLECTION DEVICES FORMED IN AN ARRAY CONFIGURATION

(75) Inventor: Xiao Yang, Cupertino, CA (US)

(73) Assignee: Miradia Inc., Sunnyvale, CA (US)

( * ) Notice: Subject to any disclaimer, the term of this patent is extended or adjusted under 35 U.S.C. 154(b) by 77 days.

(21) Appl. No.: 11/031,986

(22) Filed: Jan. 7, 2005

(65) Prior Publication Data
US 2006/0152795 A1   Jul. 13, 2006

(51) Int. Cl.
*G02B 26/00*   (2006.01)
(52) U.S. Cl. ............... 359/295; 359/290; 359/291
(58) Field of Classification Search ........... 359/290, 359/291, 295, 245, 263
See application file for complete search history.

(56) References Cited

U.S. PATENT DOCUMENTS

| | | | |
|---|---|---|---|
| 4,229,732 A | 10/1980 | Hartstein et al. | |
| 4,317,611 A | 3/1982 | Petersen | |
| 4,566,935 A | 1/1986 | Hornbeck | |
| 4,615,595 A | 10/1986 | Hornbeck | |
| 4,912,537 A * | 3/1990 | Boyd | 257/229 |
| 5,061,049 A | 10/1991 | Hornbeck | |
| 5,172,262 A | 12/1992 | Hornbeck | |
| 5,311,360 A | 5/1994 | Bloom et al. | |
| 5,382,961 A | 1/1995 | Gale, Jr. | |
| 5,448,314 A | 9/1995 | Heimbuch et al. | |
| 5,452,024 A | 9/1995 | Sampsell | |
| 5,489,952 A | 2/1996 | Gove et al. | |
| 5,504,614 A | 4/1996 | Webb et al. | |
| 5,535,047 A | 7/1996 | Hornbeck | |
| 5,583,688 A | 12/1996 | Hornbeck | |
| 5,589,852 A | 12/1996 | Thompson et al. | |
| 5,600,383 A | 2/1997 | Hornbeck | |

(Continued)

FOREIGN PATENT DOCUMENTS

EP   1237032 A2   9/2002

OTHER PUBLICATIONS

Henley et al., "A New SOI Manufacturing Technology Using Atomic layer Cleaving." Silicon Genesis Corporation Campbell CA. pp. 1-5.

(Continued)

*Primary Examiner*—Timothy Thompson
*Assistant Examiner*—Jerry Fang
(74) *Attorney, Agent, or Firm*—Townsend and Townsend and Crew LLP

(57) ABSTRACT

A method of fabricating an electrical connection for a spatial light modulator includes providing a first substrate including a plurality of bias electrodes and a plurality of dielectric bond pads. The method also includes providing a second substrate of a predetermined thickness, the second substrate including a plurality of recessed regions within the predetermined thickness and arranged in a spatial manner as a second array, each of the recessed regions being bordered by a standoff region, and joining the dielectric bond pads of the first substrate to the standoff region of the second substrate. The method further includes forming mirror structures from a first portion of the second substrate, exposing a portion of the upper surface of the plurality of bias electrodes, and depositing a conductive layer on the mirror structures and the exposed portion of the upper surface of the plurality of bias electrodes.

10 Claims, 12 Drawing Sheets

U.S. PATENT DOCUMENTS

| | | | |
|---|---|---|---|
| 5,636,051 A * | 6/1997 | Lim ........................ 359/290 |
| 5,661,591 A | 8/1997 | Lin et al. |
| 5,663,749 A | 9/1997 | Farris et al. |
| 5,742,419 A | 4/1998 | Dickensheets et al. |
| 5,757,536 A | 5/1998 | Ricco et al. |
| 5,835,256 A | 11/1998 | Huibers |
| 5,885,468 A | 3/1999 | Kozlowski |
| 5,939,171 A | 8/1999 | Biebl |
| 5,999,306 A | 12/1999 | Atobe et al. |
| 6,038,056 A | 3/2000 | Florence et al. |
| 6,046,840 A | 4/2000 | Huibers |
| 6,049,317 A | 4/2000 | Thompson et al. |
| 6,127,756 A | 10/2000 | Iwaki et al. |
| 6,172,797 B1 | 1/2001 | Huibers |
| 6,201,521 B1 | 3/2001 | Doherty |
| 6,252,277 B1 | 6/2001 | Chan et al. |
| 6,323,982 B1 | 11/2001 | Hornbeck |
| 6,337,760 B1 | 1/2002 | Huibers et al. |
| 6,356,376 B1 * | 3/2002 | Tonar et al. ............ 359/267 |
| 6,356,378 B1 | 3/2002 | Huibers |
| 6,388,661 B1 | 5/2002 | Richards |
| 6,396,619 B1 | 5/2002 | Huibers et al. |
| 6,429,033 B1 | 8/2002 | Gee et al. |
| 6,529,310 B1 | 3/2003 | Huibers et al. |
| 6,538,800 B2 | 3/2003 | Huibers |
| 6,542,653 B2 | 4/2003 | Wu et al. |
| 6,543,286 B2 | 4/2003 | Garverick et al. |
| 6,809,852 B2 | 10/2004 | Tao et al. |
| 6,856,068 B2 | 2/2005 | Miller et al. |
| 2002/0041455 A1 | 4/2002 | Sawada et al. |
| 2002/0071166 A1 | 6/2002 | Jin et al. |
| 2002/0071169 A1 | 6/2002 | Bowers et al. |
| 2002/0079550 A1 * | 6/2002 | Daneman et al. ............ 257/459 |
| 2002/0132389 A1 | 9/2002 | Patel et al. |
| 2003/0117686 A1 | 6/2003 | DiCarlo |
| 2003/0207487 A1 | 11/2003 | Kubena et al. |
| 2004/0000696 A1 | 1/2004 | Ma et al. |
| 2004/0004753 A1 | 1/2004 | Pan |
| 2004/0008402 A1 | 1/2004 | Patel et al. |
| 2004/0125347 A1 | 7/2004 | Patel et al. |
| 2004/0136044 A1 | 7/2004 | Miller et al. |
| 2004/0184133 A1 | 9/2004 | Su et al. |
| 2004/0190817 A1 | 9/2004 | Aubuchon |
| 2005/0041277 A1 | 2/2005 | Huibers |

OTHER PUBLICATIONS

Petersen, K.E., Micromechanical Light Modulator Array Fabricated On Silicon. Applied Physics Letters. Oct. 15, 1977, pp. 521-523, vol. 31 No. 8.

Petersen, K.E., Micromechanical Membrane Switches On Silicon. IBM J. Res. Develop., Jul. 1979, pp. 376-385. vol. 23, No. 4.

* cited by examiner

ELECTRICAL CONTACT METHOD AND STRUCTURE FOR DEFLECTION DEVICES FORMED IN AN ARRAY CONFIGURATION

BACKGROUND OF THE INVENTION

This present invention relates generally to manufacturing objects. More particularly, the invention relates to a method and structure for fabricating electrical connections for spatial light modulators. Merely by way of example, the invention has been applied to the formation of an electrical connector running from a bias grid on a substrate to a reflective surface deposited on a mirror structure. The method and structure can be applied to spatial light modulators as well as other devices, for example, micro-electromechanical sensors, detectors, and displays.

Micro-electromechanical systems (MEMS) are used in a number of application areas. For example, MEMS have been used in micro-mirror arrays, sensors, and actuators. In some of these applications, a suspended member is supported by a flexible hinge attached to a stationary portion of the mirco-mirror array. Flexibly attached to the hinge, the suspended member is attracted to an electrode upon application of an electrical force and restored to an original position by a restoring force. In this manner, the array of micro-mirrors can be tilted in relation to a light source. In some applications, the suspended member is coated with a reflective surface to increase the reflectivity of the array of micro-mirrors. Furthermore, in some applications, it is beneficial to have the suspended member electrically coupled to a source of electrical current to facilitate the application of the electrical force and prevent static charging of the suspended member.

As merely an example, conventional MEMS have utilized various electrical connector schemes to couple the suspended member to a source of electrical current. For example, some micro-mirror designs utilize a single electrical connection at an outer edge of the micro-mirror array that is distributed over the array through a series of connectors. Unfortunately, these techniques also have limitations. For example, an extended current path may result in propagation delays that can adversely impact the response time of individual elements of the MEMS array. Therefore, there is a need in the art for methods and apparatus for fabricating electrical connections for spatial light modulators.

SUMMARY OF THE INVENTION

According to the present invention, techniques for manufacturing objects are provided. More particularly, the invention includes a method and structure for fabricating electrical connections for spatial light modulators. Merely by way of example, the invention has been applied to the formation of an electrical connector running from a bias grid on a substrate to a reflective surface deposited on a mirror structure. The method and structure can be applied to spatial light modulators as well as other devices, for example, micro-electromechanical sensors, detectors, and displays.

In one embodiment of the present invention, a method of fabricating an electrical connection for a spatial light modulator is provided. The method includes providing a first substrate, the first substrate including: a plurality of bias electrodes coupled to the device substrate, each of the bias electrodes having an upper surface and a lower surface and arranged in a spatial manner as a first array and a plurality of dielectric bond pads coupled to the plurality of bias electrodes. The method also includes providing a second substrate of a predetermined thickness, the second substrate including a plurality of recessed regions within the predetermined thickness and arranged in a spatial manner as a second array, each of the recessed regions being bordered by a standoff region, the standoff region having a thickness defined by a portion of the predetermined thickness and joining the dielectric bond pads of the first substrate to the standoff region of the second substrate. The method further includes forming mirror structures from a first portion of the second substrate, exposing a portion of the upper surface of the plurality of bias electrodes, and depositing a conductive layer on the mirror structures and the exposed portion of the upper surface of the plurality of bias electrodes to provide an electrical connection between the plurality of bias electrodes and the mirror structures.

In another embodiment of the present invention, another method of fabricating an electrical connection for a spatial light modulator is provided. The method includes providing a first substrate, the first substrate including: a bias electrode array coupled to the device substrate, the bias electrode array having an upper surface and a lower surface, a dielectric standoff array coupled to the upper surface of the bias electrode array, and a conductive connector array coupled to the upper surface of the bias electrodes and partially surrounded by the dielectric standoff array. The method also includes providing a second substrate having an upper surface and a bonding surface and joining the dielectric standoff array to the bonding surface. The method further includes forming mirror structures from a portion of the second substrate, exposing at least an upper surface of the conductive connector array, and depositing a conductive layer on the mirror structures and the upper surface of the conductive connector array. In a specific embodiment, the first substrate further includes an additional dielectric layer coupled to the dielectric standoff regions and the conductive connector array and the step of exposing at least an upper surface of the conductive connector array further includes etching a portion of the additional dielectric layer to expose the upper surface of the conductive connector array.

In yet another embodiment of the present invention, a spatial light modulator adapted to reflect incident light is provided. The spatial light modulator includes a first substrate comprising a bias grid, a bias electrode array coupled to the first substrate and electrically coupled to the bias grid, and a dielectric bond pad array coupled to the bias electrode array. The spatial light modulator further includes a standoff region array coupled to the dielectric bond pad array, a plurality of mirror plates having an upper surface, the plurality of mirror plates flexibly coupled to the standoff region array, and an electrically conductive layer deposited on the upper surface of the plurality of mirror plates and a portion of the bias electrode array to electrically couple the plurality of mirror plates to the bias electrode array.

Many benefits are achieved by way of the present invention over conventional techniques. For example, the present technique provides an easy to use process that relies upon conventional technology. In some embodiments, the method provides reduced propagation delays for bias signals. Additionally, the method provides a process that is compatible with conventional process technology without substantial modifications to conventional equipment and processes. Preferably, the invention provides for an improved integrated structure including integrated circuits and mirror structures for display applications. Depending upon the embodiment, one or more of these benefits may be achieved. These and other benefits will be described in more throughout the present specification and more particularly below.

Various additional objects, features and advantages of the present invention can be more fully appreciated with reference to the detailed description and accompanying drawings that follow.

DESCRIPTION OF SPECIFIC EMBODIMENTS

According to the present invention, techniques for manufacturing objects are provided. More particularly, the invention includes a method and structure for fabricating electrical connections for spatial light modulators. Merely by way of example, the invention has been applied to the formation of an electrical connector running from a bias grid on a substrate to a reflective surface deposited on a mirror structure. The method and structure can be applied to spatial light modulators as well as other devices, for example, micro-electromechanical sensors, detectors, and displays.

Figure 1:
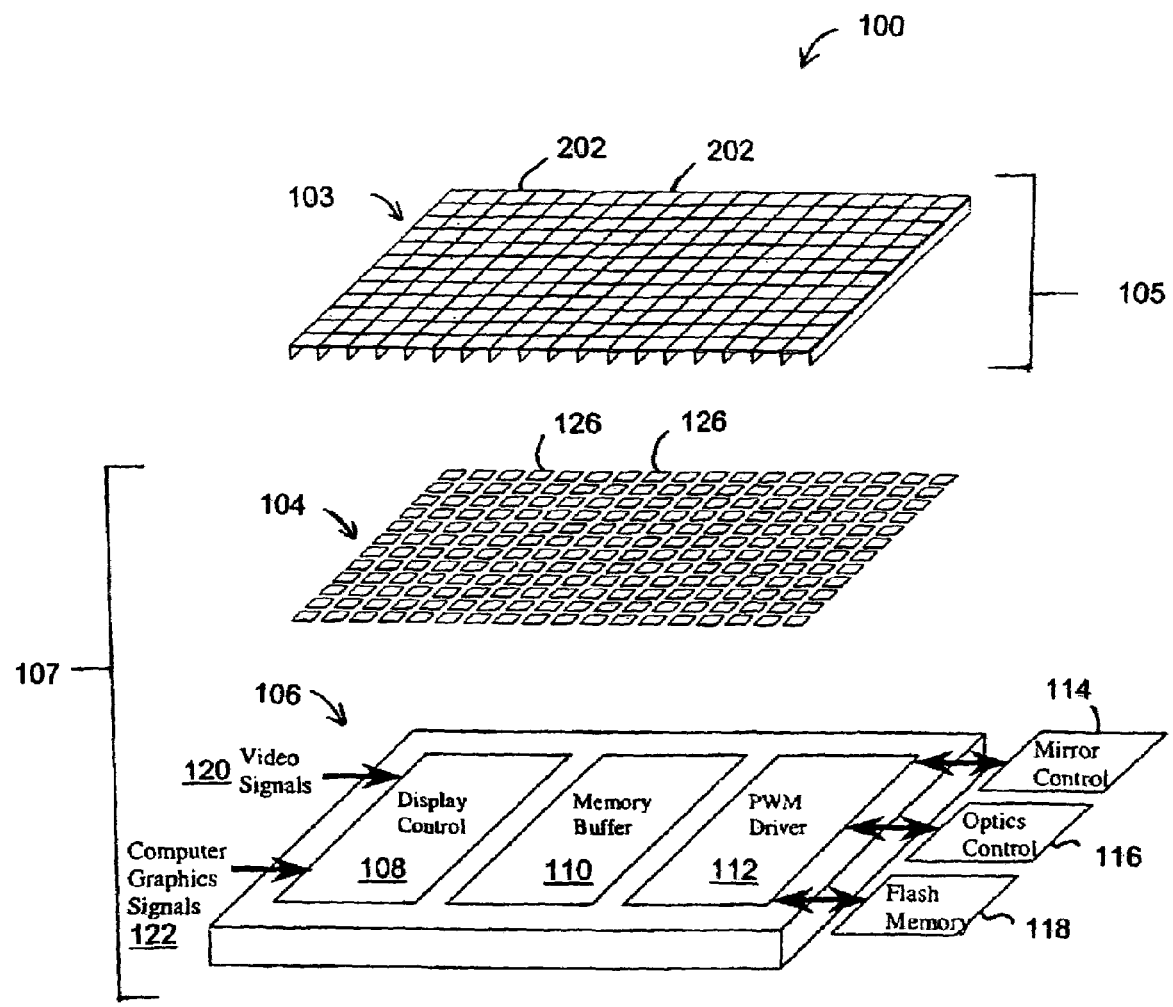
FIG. 1 is a diagram that illustrates the general architecture of a spatial light modulator according to one embodiment of the invention.

FIG. 1 is a diagram that illustrates the general architecture of a spatial light modulator (SLM) 100 according to one embodiment of the invention. The illustrated embodiment has three layers. The first layer is a mirror array 103 that has a plurality of deflectable micro-mirrors 202. In one preferred embodiment, the micro-mirror array 103 is fabricated from a first substrate 105 that is a single material, such as single crystal silicon. An example of one way of forming this SLM is described in U.S. patent application Ser. No. 10/378,056, filed Feb. 27, 2003, commonly owned, and hereby incorporated by reference for all purposes.

The second layer is an electrode array 104 with a plurality of electrodes 126 for controlling the micro-mirrors 202. Each electrode 126 is associated with a micro-mirror 202 and controls the deflection of that micro-mirror 202. Addressing circuitry allows selection of a single electrode 126 for control of the particular micro-mirror 202 associated with that electrode 126.

The third layer is a layer of control circuitry 106. This control circuitry 106 has addressing circuitry, which allows the control circuitry 106 to control a voltage applied to selected electrodes 126. This allows the control circuitry 106 to control the deflections of the mirrors 202 in the mirror array 103 via the electrodes 126. Typically, the control circuitry 106 also includes a display control 108, line memory buffers 110, a pulse width modulation array 112, and inputs for video signals 120 and graphics signals 122. A microcontroller 114, optics control circuitry 116, and a flash memory 118 may be external components connected to the control circuitry 106, or may be included in the control circuitry 106 in some embodiments. In various embodiments, some of the above listed parts of the control circuitry 106 may be absent, may be on a separate substrate and connected to the control circuitry 106, or other additional components may be present as part of the control circuitry 106 or connected to the control circuitry 106.

In one embodiment, both the second layer 104 and the third layer 106 are fabricated using semiconductor fabrication technology on a single second substrate 107. That is, the second layer 104 is not necessarily separate and above the third layer 106. Rather, the term "layer" is an aid for conceptualizing different parts of the spatial light modulator 100. For example, in one embodiment, both the second layer 104 of electrodes is fabricated on top of the third layer of control circuitry 106, both fabricated on a single second substrate 107. That is, the electrodes 126, as well as the display control 108, line memory buffers 110, and the pulse width modulation array 112 are all fabricated on a single substrate in one embodiment. Integration of several functional components of the control circuitry 106 on the same substrate provides an advantage of improved data transfer rate over conventional spatial light modulators, which have the display control 108, line memory buffers 110, and the pulse width modulation array 112 fabricated on a separate substrate. Further, fabricating the second layer of the electrode array 104 and the third layer of the control circuitry 106 on a single substrate 107 provides the advantage of simple and cheap fabrication, and a compact final product. After the layers 103, 104, and 106 are fabricated, they are bonded together to form the SLM 100. Additional examples of methods for joining the substrates to form a bonded substrate structure are described in U.S. patent application Ser. No. 10/756,923, filed Jan. 13, 2004, commonly owned, and hereby incorporated by reference for all purposes.

Figure 2:
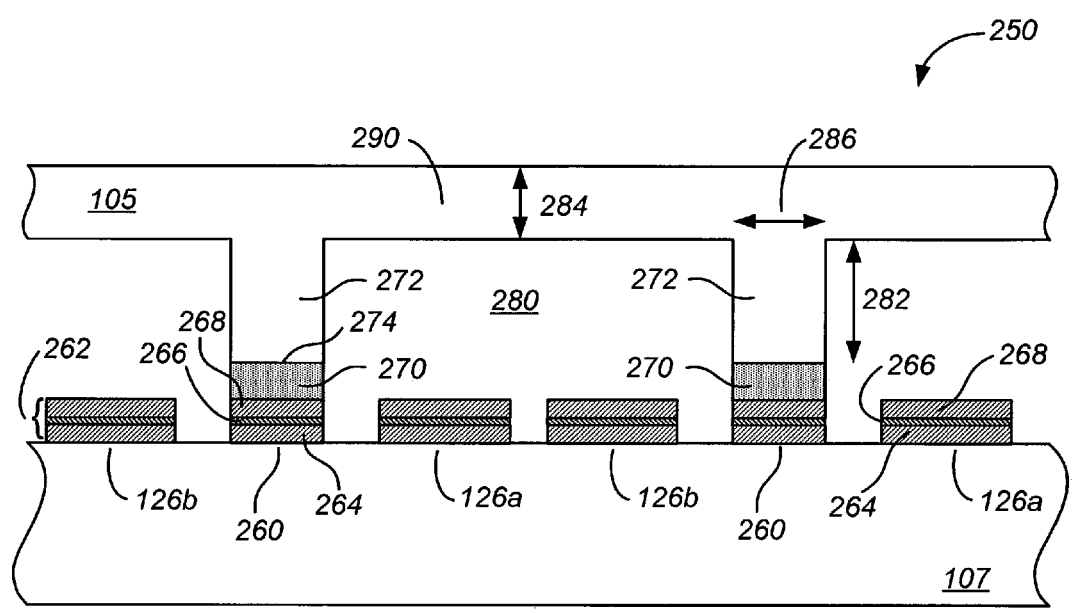
FIGS. 2–5 are simplified schematic illustrations representing a process flow for fabricating a spatial light modulator according to an embodiment of the present invention.

FIG. 2 is a simplified schematic illustration of a bonded substrate structure according to one embodiment of the present invention. Substrate 107 includes electrodes 126, as well as display control, line memory buffers, and the pulse width modulation array circuitry (not shown) as described above. In a specific embodiment, electrodes 126 are fabricated from a number of materials that conduct electricity and are referred to as control electrodes because they are used to control the deflection of the mirrors associated with the electrodes. Merely by way of example, the control electrodes in the embodiment according to the present invention illustrated in FIG. 2 are made of a multi-layer stack of metals preferentially deposited on the surface of substrate 107. Preferably, the electrode is made of a deposited titanium nitride (TiN) layer 264, a deposited aluminum layer 266, and a second deposited TiN layer 268. In alternative embodiments according to the present invention, the electrodes are made of tungsten or other suitable conductors. The thickness 262 of the electrode stack in one embodiment is 8,000 Å.

In addition to the formation of control electrodes 126 on the surface of substrate 107, bias electrodes 260 are formed in embodiments of the present invention. In a specific embodiment, the bias electrodes 260 are formed during the same fabrication processes as the control electrodes. As illustrated in FIG. 2, the bias electrodes are made of a multi-layer stack of metals preferentially deposited on the surface of substrate 107. Preferably, the electrode is made of a deposited titanium nitride (TiN) layer 264, a deposited aluminum layer 266, and a second deposited TiN layer 268.

In alternative embodiments according to the present invention, the bias electrodes 260 are made of tungsten or other suitable conductors.

Dielectric bond pads 270 are formed in contact with bias electrodes 260 as illustrated in FIG. 2. In a specific embodiment, dielectric bond pads are formed from a 5,000 Å layer of deposited and patterned silicon dioxide, but this is not required by the present invention. Other suitable materials that provide a contact region suitable for bonding of substrates 107 and 105 are utilized in alternative embodiments. Alternative embodiments utilize deposited and patterned layers of silicon nitride, silicon oxynitride, spin-on-glass (SOG), low-k dielectrics, or the like. Moreover, dielectric bond pads 270 may be formed by a combination of such layers. Preferably, a dielectric layer is deposited by a low temperature process that preserves the integrity of the control circuitry and electrodes fabricated on substrate 107 in previous processing steps. For example, a low temperature plasma enhanced chemical vapor deposition (PECVD) process is used in one embodiment to deposit a dielectric layer covering substrate 107. Alternative embodiments employ atmospheric or low pressure chemical vapor deposition (CVD) process to form the dielectric layer. The dielectric layer may be planarized after deposition, for example, by using a chemical mechanical polishing (CMP) process to form a uniform upper dielectric surface for the layer from which the dielectric bond pads are formed. Planarization processes for dielectric layers utilized in multilevel interconnect applications are well known to one of skill in the art.

After deposition of one or more dielectric layers and optional polishing steps, a photoresist layer is deposited on the dielectric layer or layers. The photoresist layer is utilized in patterning of the dielectric through etching or other techniques to form the dielectric bond pads 270. As illustrated in FIG. 2, the deposited dielectric layer utilized to form the dielectric bond pads 270 is removed from all portions of the substrate 107 other than where the bond pads are present, but this is not required by the present invention. In alternative embodiments, portions of the dielectric layer remain on the substrate 107 and cover control electrodes 126 to provide passivation benefits. In embodiments in which CMP processes are utilized to planarize the deposited dielectric layer, the upper surfaces 274 of bond pads 270 provide an extremely smooth surface suitable for bonding to portions of substrate 105.

In one embodiment of the present invention, a method of fabricating an electrical connection for a spatial light modulator includes providing a second substrate 105 of a predetermined thickness, the second substrate including a number of recessed regions within the predetermined thickness and arranged in a spatial manner as a second array, each of the recessed regions being bordered by a standoff region, the standoff region having a thickness defined by a portion of the predetermined thickness.

Figure 6:
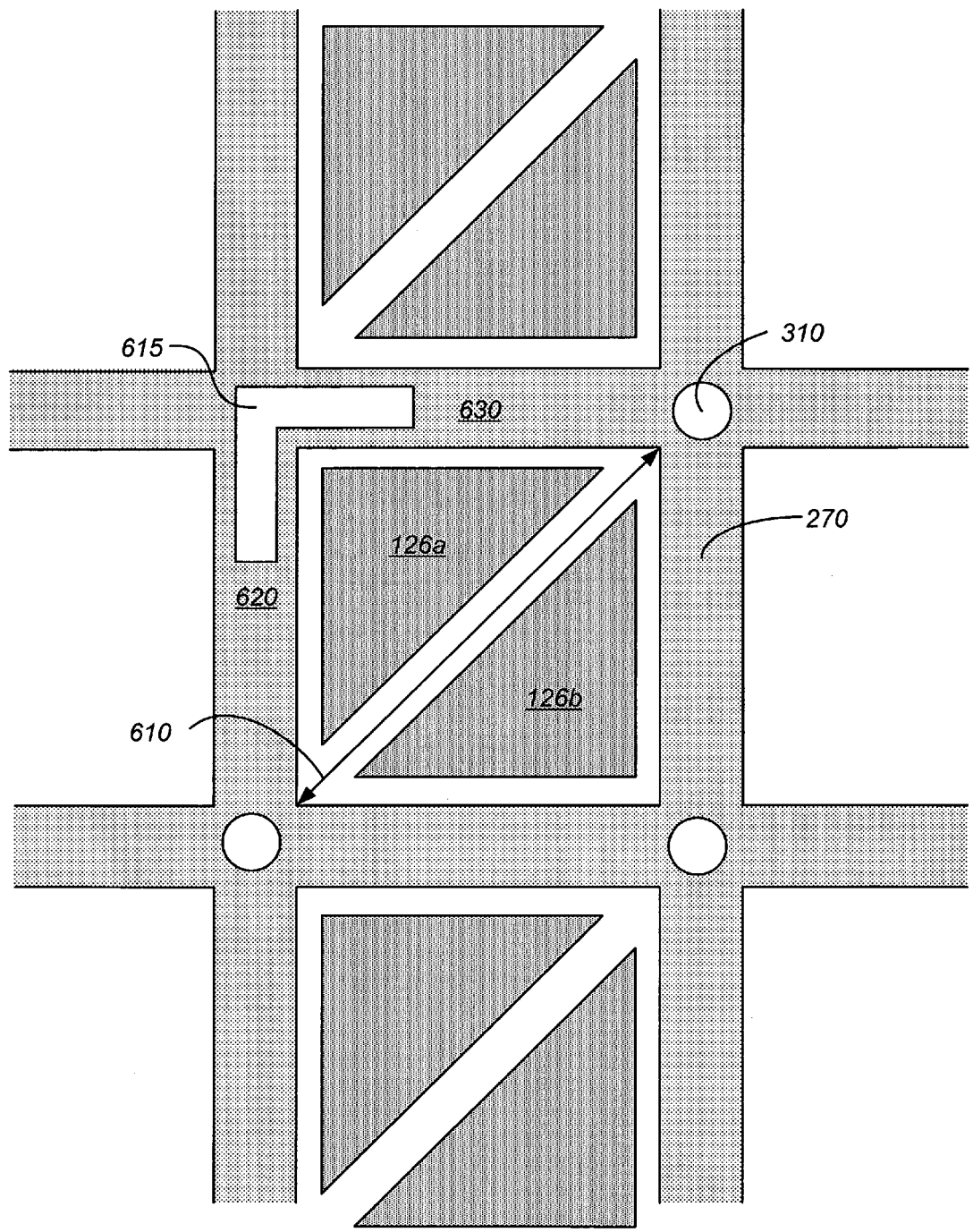
FIG. 6 is a simplified top-view illustration of a portion of a spatial light modulator according to one embodiment of the present invention.

As illustrated in FIGS. 2 and 6, standoff regions 272 are provided on a bonding surface of substrate 105. In a particular embodiment according to the present invention, the height 282 of the standoff regions is a predetermined height. For example, the standoff regions have a height of 2.0 µm in one embodiment. In alternative embodiments, the height ranges from about 0.5 µm to about 3.0 µm. Moreover, the standoff regions 272 used in embodiments of the present invention have a predetermined width 286. For example, the standoff regions have a width of 1.0 µm in one embodiment. In alternative embodiments, the width ranges from about 0.1 µm to about 1.5 µm. Referring to FIG. 6, a simplified top-view illustration of a portion of a spatial light modulator fabricated according to an embodiment of the present invention is illustrated. The dielectric bond pads 270 and the standoff regions 272 form a two-dimensional waffle pack grid pattern. Control electrodes 126 are fabricated in the general shape of triangles and oriented to cause deflection of the mirror around axis 610.

As illustrated in FIG. 2, substrate 105 has been processed to form recessed regions 280 on a lower surface of substrate 105. In a particular embodiment, the bonding surface 274 of standoff regions 272 is a polished single crystal silicon surface. Wafer bonding techniques are used in some embodiments to form a hermetic seal between dielectric bond pads 270 and standoff regions 272. For example, bonding may be accomplished through the use of anodic, eutectic, fusion, covalent, glass frit, and other bonding techniques. In embodiments in which dielectric bond pads 270 and standoff regions 272 are silicon dioxide and silicon, respectively, room temperature covalent bonding techniques are used to form a hermetically sealed bond between the structures. Of course, one of ordinary skill in the art would recognize many variations, modifications, and alternatives.

In some embodiments, substrate 105 initially includes additional layers for structural support and to provide benefits during processing. After the substrate bonding process described above, these additional layers are removed in some embodiments to produce a substrate 105 consisting essentially of single crystal silicon layer 290 with attached standoff structures 272 as illustrated in FIG. 2. After these layer removal and/or polishing steps, the thickness 284 of the layer 290 is 0.3 µm. As described more fully below, layer 290 is processed in some embodiments to form a number of micro-mirror devices. Therefore, the thickness 284 is selected to optimize design constraints for the micro-mirror devices, including structural rigidity, flexibility, and amount of inertia.

Figure 3:
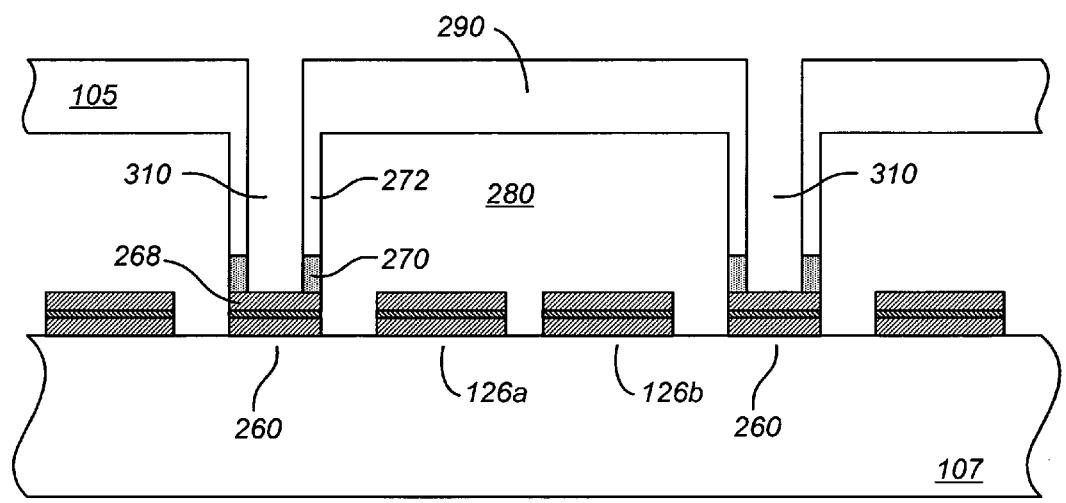

FIG. 3 is a simplified schematic illustration of a bonded substrate structure according to one embodiment of the present invention at one stage of processing. As illustrated in FIG. 3, openings 310 have been made in layer 290 of substrate 105, as well as through central portions of standoff regions 272 and dielectric bond pads 270. Reference to FIG. 6 will illustrate that the openings 310 may be either discrete or continuous when viewed from the top. In one embodiment, a photoresist layer is deposited on the upper surface of substrate 105, patterned and used as an etch mask to etch openings 310 through layer 290 and regions 272, and 270. In a specific embodiment, the etch process is terminated at the lower surface of dielectric bond pads 270 when TiN layer 268 is reached. Etch chemistry that is selective for silicon and silicon dioxide over TiN is well known to one of skill in the art. As illustrated in the figure, an anisotropic etch that produces straight side walls for feature 310 is used in some embodiments, although this is not required by the present invention. In alternative embodiments, other etch processes that produce openings of sufficient size and profile are utilized. As illustrated in FIG. 6, one embodiment of the present invention utilizes openings 310 that are circular in cross-section and uniform in diameter as a function of height when viewed from the top. As also illustrated in FIG. 6, alternative embodiments, utilize cross-sections of different shapes including rectangular and square cross-sections.

Figure 4:
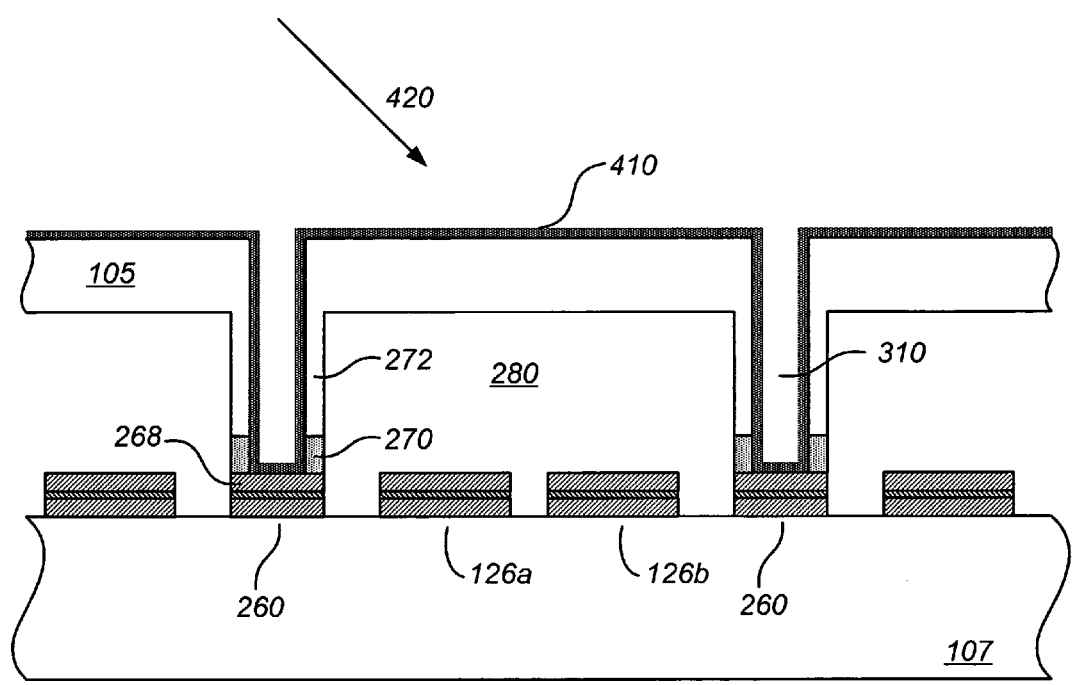

FIG. 4 is a simplified schematic illustration of a bonded substrate structure according to one embodiment of the present invention at another stage of processing. As illustrated in the figure, at least one layer of material 410 has been deposited on the substrate 105 and in openings 310. In some embodiments of the present invention, the deposited material is able to both conduct electricity and reflect optical radiation. In a particular embodiment, the material 410 is a multi-layer stack of metals preferentially deposited on the surface of substrate 105 and in openings 310. Preferably, the material 410 is made of a deposited TiN layer and a deposited aluminum layer. For example, in a specific embodiment, the TiN layer is 150 Å thick and the aluminum layer is 300 Å thick. In alternative embodiments according to the present invention, the thickness and composition of the deposited layer or layers of material 410 is varied, utilizing other materials that conduct electricity and reflect light in the visible region.

As illustrated in FIG. 4, multi-layer stack 410 provides a reflective coating on the upper surface of substrate 105. As described more fully below, portions of substrate 105 are processed to form micro-mirrors, which reflect light incident along line 420. Thus, the upper layer of stack 410 illustrated in FIG. 4, which includes an aluminum layer, provides a high reflectivity coating for the mirror surface suitable for reflecting incident radiation in the visible region. Moreover, since the multi-layer stack 410 passes through insulating dielectric layer 270, layer 410 provides for electrical connection between the mirrors formed in portions of substrate 105 and the bias electrodes 260. As illustrated in FIG. 4, layer 410 and bias electrode 260 are coupled at the upper surface of TiN layer 268, which forms the upper portion of bias electrode 260. Thus, structure 410 provides not only a reflective coating on the upper surface of substrate 105, but also provides for an electrical connection between the mirror surface and the bias electrodes. Semiconductor processing techniques suitable for enhancing the electrical contact between the conductive layer 410 and the TiN layer 268 are well known to one of skill in the art, including plasma treatment after formation of openings 310 and prior to deposition of the first layer making up the multi-layer stack 410.

Figure 5:
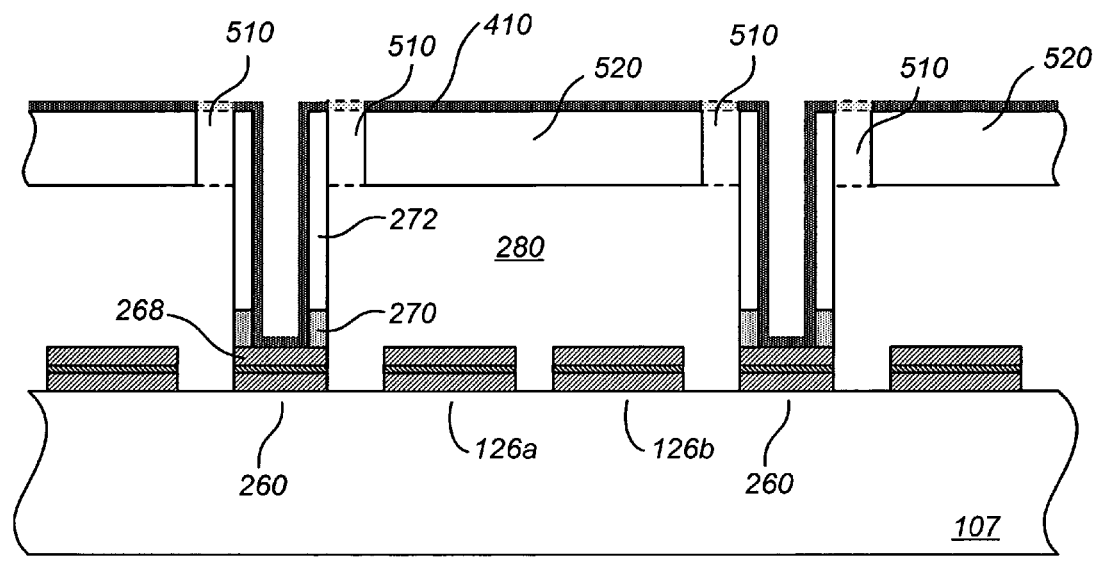

FIG. 5 is a simplified schematic illustration of a bonded substrate structure according to one embodiment of the present invention at the mirror release stage of processing. As illustrated, the upper substrate has been patterned and processed to form a number of openings 510, creating a number of micro-mirrors 520. Although FIG. 5 illustrates a cross-sectional view of the mirror structures, one of ordinary skill in the art will appreciate that a three-dimensional structure is represented by the figure. Openings 510 are illustrated with a dashed line to represent the formation of hinges coupled to standoff regions 272 and open spaces between mirrors 520 and standoff regions 272. Moreover, openings 510 provide electrical continuity across multi-layer stack 410, which provides for electrical connection between the mirrors 520 and the bias electrodes 260. Thus, the portions of multi-layer stack 410 deposited in openings 310 and making electrical contact with TiN layer 268 in FIG. 5 are electrically connected to mirrors 520. As described below with reference to FIG. 7, hinges extending across portions of openings 510 provide both structural support and electrical connectivity between standoff structure 272 and mirrors 520.

FIG. 6 is a simplified top-view illustration of a portion of a spatial light modulator according to one embodiment of the present invention. For purposes of clarity, certain portions of the spatial light modulator have been omitted from FIG. 6. As illustrated in the figure, dielectric bond pads 270 and the standoff regions coupled to the bond pads form a two-dimensional waffle pack grid pattern when viewed from the top. Openings 310 are provided that extend through layer 290 of substrate 105, the standoff regions 272, and the dielectric bond pads 270. Although openings 310 are illustrated as having a circular cross-section, this is not required by the present invention. In some embodiments, the openings 615 extend along the horizontal and vertical dimensions of the dielectric bond pads. Openings 615 provide for electrical contact between the mirror surface and the bias electrodes, not only at the corners of the mirrors, as illustrated by openings 310, but also along the sides 620 and tops 630 of the mirrors.

Control electrodes 126a and 126b, formed in the general shape of triangles, are positioned to activate a mirror (not shown) associated with each set of electrodes. As illustrated in FIG. 6, the control electrode are oriented to cause deflection of the mirror around axis 610. One of ordinary skill in the art would recognize many variations, modifications, and alternatives. As discussed in relation to FIG. 2, the dimensions of the dielectric bond pads and the standoff regions are selected depending on the particular application. As illustrated in FIG. 6, the dimensions are not drawn to scale, but simplified for purposes of clarity.

Figure 7:
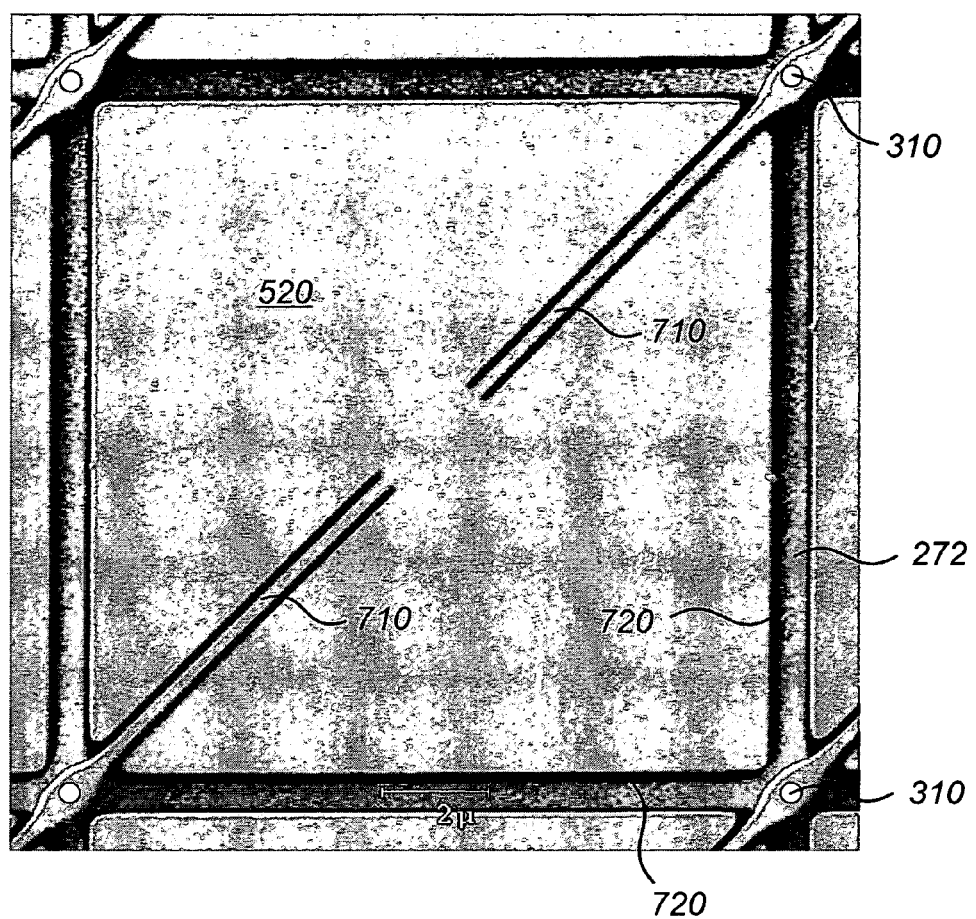
FIG. 7 is a simplified top-view illustration of another portion of a spatial light modulator according to one embodiment of the present invention.

Referring to FIG. 7, a simplified top view illustration of another portion of a spatial light modulator according to one embodiment of the present invention is illustrated. Micro-mirror 520 is coupled to standoff structures 272 by torsion spring hinges 710. As illustrated, the torsion spring hinges provide electrical continuity between the reflective layer deposited on the micro-mirror surface and the material deposited in openings 310, which is electrically coupled to the bias grid. Thus, in some embodiments of the present invention, each micro-mirror is coupled to the bias grid through an electrical connection adjacent to the micro-mirror. Local coupling of the micro-mirrors to the bias grid decreases propagation delays present in some alternative designs. Openings 720 provide space for the micro-mirrors to rotate about the axis defined by the longitudinal dimension of the torsion spring hinge without contacting standoff regions 272.

Figure 8:
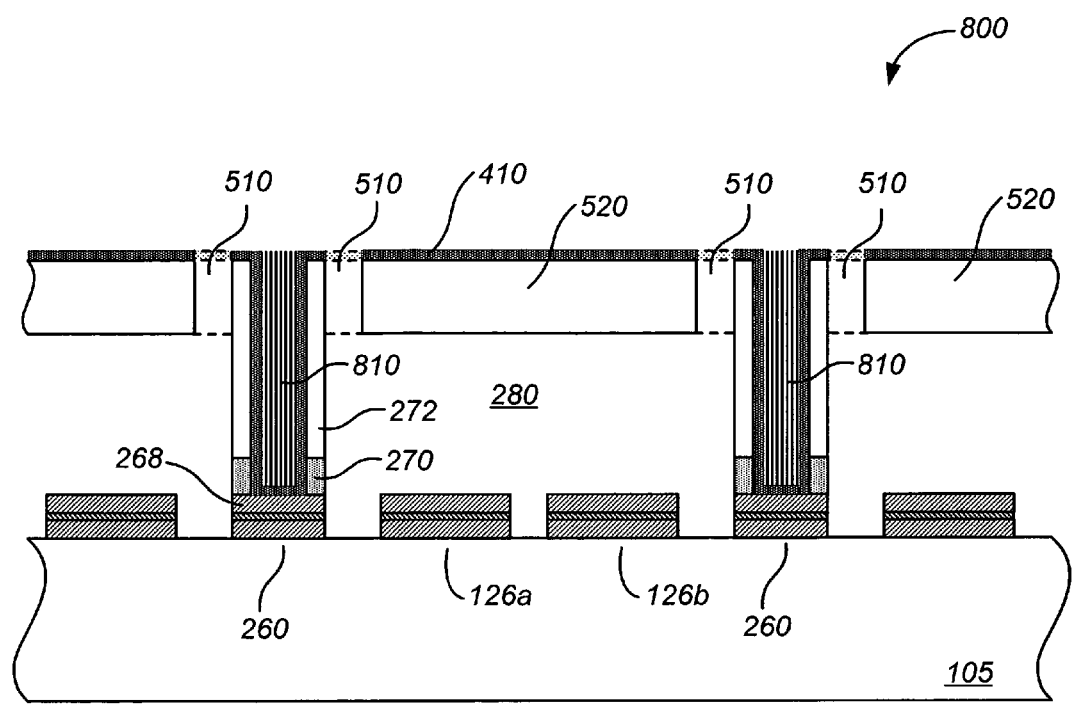
FIG. 8 is a simplified schematic illustration of a spatial light modulator fabricated according to another process flow in accordance with another embodiment of the present invention.

FIG. 8 is a simplified schematic illustration of a spatial light modulator fabricated according to another process flow in accordance with another embodiment of the present invention. As illustrated in FIG. 8, the internal aspects of openings (310 in FIG. 4) created in standoff regions 272 are not only coated by multi-layer stack 410, but additionally are filled with material 810, sometimes referred to as fill plugs. In some embodiments, the material 810 is an electrical conductor that is deposited following the deposition of multi-layer stack 410. In a specific embodiment, fill plugs 810 completely fill the openings formed in standoff regions 272, providing for electrical continuity between bias electrodes 260 and micro-mirrors 520 in situations for which multi-layer stack 410 does not provide a continuous layer on the vertical sides of the openings formed in standoff regions 272. Of course, patterning of the spatial light modulator and deposition procedures for the formation of fill plugs 810 are well known to one of skill in the art. In one embodiment, the fill plugs are formed from aluminum or other suitable metals that provide electrical conductivity and uniform deposition. In another embodiment, the fill plugs are formed from tungsten fabricated using tungsten via plug processes.

Figure 9:
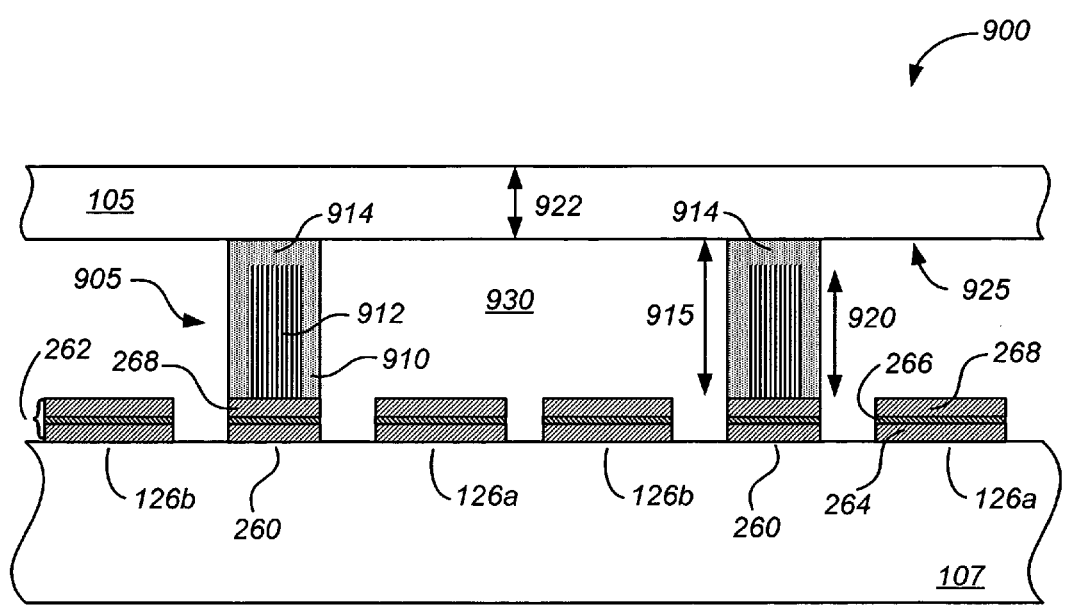
FIGS. 9–12 are simplified schematic illustrations representing a process flow for fabricating a spatial light modulator according to yet another embodiment of the present invention.

FIGS. 9—12 are simplified schematic illustrations representing a process flow for fabricating a spatial light modulator according to yet another embodiment of the present invention. As illustrated in FIG. 9, substrate 107 includes electrodes 126, as well as display control, line memory buffers, and the pulse width modulation array circuitry (not shown) as described above. In a specific embodiment, electrodes 126 are fabricated from a number of materials that conduct electricity and are referred to as control electrodes because they are used to control the deflection of the mirrors. Merely by way of example, the control electrodes in the embodiment according to the present invention illustrated in FIG. 9 are made of a multi-layer stack of metals preferentially deposited on the surface of substrate 107. Preferably, the electrode is made of a deposited titanium nitride (TiN) layer 264, a deposited aluminum layer 266, and a second deposited TiN layer 268. In alternative embodiments according to the present invention, the electrodes are made of tungsten or other suitable conductors. The thickness 262 of the electrode stack in one embodiment is 8,000 Å.

In addition to the formation of control electrodes 126 on the surface of substrate 107, bias electrodes 260 are formed in embodiments of the present invention. In a specific embodiment, the bias electrodes 260 are formed during the same fabrication processes as the control electrodes. As illustrated in FIG. 9, the bias electrodes are made of a multi-layer stack of metals preferentially deposited on the surface of substrate 107. Preferably, the electrode is made of a deposited titanium nitride (TiN) layer 264, a deposited aluminum layer 266, and a second deposited TiN layer 268. In alternative embodiments according to the present invention, the electrodes 260 are made of tungsten or other suitable conductors.

Dielectric standoff regions 905 are formed in contact with bias electrodes 260 and upper substrate 105 as illustrated in FIG. 9. In a particular embodiment according to the present invention, the height 915 of the dielectric standoff regions is a predetermined height. For example, the dielectric standoff regions have a height of 2.0 µm in one embodiment. In alternative embodiments, the height ranges from about 1.5 µm to about 3.0 µm. As illustrated, dielectric standoff regions 905 include an outer portion 910, an inner portion 912, and a top portion 914. Alternative embodiments include some or all of these portions. The fabrication of the structure 905 will be described more fully below.

In a specific embodiment, outer portions 910 of the dielectric standoff regions 905 are formed from a layer of deposited and patterned silicon dioxide, but this is not required by the present invention. Other suitable materials that provide sufficient mechanical rigidity along with a contact region suitable for bonding of substrates 107 and 105 are utilized in alternative embodiments. Alternative embodiments utilize deposited and patterned layers of silicon nitride, silicon oxynitride, spin-on-glass (SOG), low-k dielectrics, or the like. Moreover, outer portions 910 of dielectric standoff regions 905 may be formed by a combination of such layers. The dielectric layer may be planarized after deposition, for example, by using a chemical mechanical polishing (CMP) process to form a uniform upper surface. Planarization processes for dielectric layers utilized in multilevel interconnect applications are well known to one of skill in the art.

As illustrated in the FIG. 9, the outer portion 910 of dielectric standoff region 905 is fabricated from silicon oxide ($Si_xO_y$), but this is not required by the present invention. Other suitable materials characterized by structural rigidity and suitable dielectric constant may be used within the scope of the present invention. For example, standoffs fabricated from silicon nitride ($Si_xN_y$) are utilized in alternative embodiments. In yet other embodiments, SiON is used to fabricate the standoff structures.

Moreover, in some embodiments of the present invention, the process used to deposit the layer or layers from which the standoff regions 905 are fabricated is performed in light of the structures present on the substrate 107. For example, some CMOS circuitry may be adversely impacted by performing high temperature deposition processes, as these high temperature deposition processes may damage metals or result in diffusion of junctions associated with the CMOS circuitry. Thus, in a particular embodiment of the present invention, low temperature deposition, patterning, and etching processes, such as processes performed at temperatures of less than 500° C., are used to form the layer from which the standoff regions 905 are fabricated. For example, a low temperature plasma enhanced chemical vapor deposition (PECVD) process is used in one embodiment to deposit a dielectric layer covering substrate 107. Alternative embodiments employ atmospheric or low pressure chemical vapor deposition (CVD) processes to form the dielectric layer. In another specific embodiment, deposition, patterning, and etching processes performed at less than 400° C., are used to form the layer from which the standoff structures are fabricated.

In some embodiments of the present invention, portions of the dielectric standoff regions are formed using oxide deposition, planarization, and patterning processes. Additional description of one such group of processes is found in U.S. application Ser. No. 11/028,946, entitled "Method and Structure for Forming an Integrated Spatial Light Modulator," filed on Jan. 3, 2005, and commonly owned and incorporated by reference for all purposes. Moreover, in other embodiments according to the present invention, portions of the dielectric standoff regions are formed using processes typically utilized for multilevel interconnect applications. Additional description of an example of such processes is found in U.S. application Ser. No. 11/031,976, entitled "Method and Structure for Reducing Parasitic Influences of Deflection Devices on Spatial Light Modulators," commonly owned and incorporated by reference for all purposes.

As illustrated in FIG. 9, in one embodiment, dielectric standoff region 905 includes an oxide support structure 910 coupled to a conductive plug 912. In some embodiments, the oxide support structure partially surrounds a tungsten plug. Of course, the use of tungsten is not required by the present invention as other conductive materials are utilized in alternative embodiments. As described more fully in the above referenced applications, one method of fabricating the dielectric standoff region 905 is by deposition of a dielectric layer followed by patterning and etching to define an opening in which a tungsten plug is formed. In a specific embodiment, the dielectric layer is a silicon dioxide layer commonly used in pre-metal dielectric (PMD) and inter-metal dielectric (IMD) multilevel interconnect applications, but this is not required by the present invention. Alternative embodiments utilize layers of silicon nitride, silicon oxynitride, spin-on-glass (SOG), low-k dielectrics, or the like. Moreover, the dielectric layer may be formed by a combination of such layers.

Preferably, the dielectric layer is formed by a low temperature process that preserves the integrity of the control circuitry and electrodes fabricated on substrate 107 in previous processing steps. For example, a low temperature plasma enhanced chemical vapor deposition (PECVD) process is used in one embodiment to deposit an oxide and form the dielectric layer. Alternative embodiments employ atmospheric or low pressure chemical vapor deposition (CVD) process to form the dielectric layer. The dielectric layer may be planarized after deposition, for example, by using a chemical mechanical polishing (CMP) process to form a uniform upper surface. Planarization processes for dielectric layers utilized in multilevel interconnect applications are well known to one of skill in the art.

In some embodiments, the dielectric layer is patterned and etched to form openings in which a tungsten plug is formed. In a typical process, a photoresist layer is deposited, exposed, and developed to form a patterned layer of photoresist. The patterned photoresist layer is used as an etch mask to selectively remove portions of the dielectric layer. In an alternative embodiment, an etch mask layer is deposited prior to the formation of the photoresist layer. The etch mask layer is patterned using the photoresist layer as a pattern mask and subsequently used as an etch mask to selectively remove portions of the dielectric layer. Openings, sometimes referred to as contact or via holes are made at locations where tungsten plugs 912 are illustrated in FIG. 9. As illustrated, these openings extend through the dielectric layer 910 to the upper layer 268 of bias electrodes 260. In some embodiments, the openings are fabricated using processes developed for contact holes through PMD layers and vias through IMD layers.

Generally, to form tungsten plugs 912, a tungsten layer is deposited in contact with and covering the dielectric layer. Preferably, the tungsten layer is deposited as a gap fill layer that fills the contact or via holes and also covers the flat areas on the upper surface of the dielectric layer. In a particular embodiment, the deposition of the tungsten layer is performed using standard gap fill processes commonly used for tungsten contact holes through PMD layers and vias through IMD layers. As such, the tungsten plug completely fills the contact or via holes without the formation of voids. In some embodiments, a generally conformal liner layer commonly used in contact hole/via plug formation processes is deposited prior to the deposition of the tungsten layer. Merely by way of example, the conformal liner layer may be formed as a TiN, TiW, or Ti layer or combination thereof. One of ordinary skill in the art would recognize many variations, modifications, and alternatives.

After deposition, the tungsten layer is typically planarized by the use of a CMP process. In the embodiment illustrated in FIG. 9, the CMP process is terminated when the height 920 of the tungsten plug 912 is a predetermined height. For example, the height may be 2.0 µm. In other embodiments, the height ranges from about 0.6 µm to about 3.0 µm. It will be apparent to one of skill in the art that multilevel interconnect techniques may be used to fabricate multiple stacked tungsten plugs to extend the height of the standoff regions. As illustrated in FIG. 9, an optional additional dielectric layer 914 is deposited, planarized, and patterned on top of the dielectric material 910 and the tungsten plug 912. In some embodiments, planarization of additional dielectric layer 914 is performed to facilitate bonding of substrate 105 to the dielectric standoff regions as described below. In other embodiments, the additional dielectric layer is not formed and the fabrication processes for substrate 107 proceed as described below.

In FIG. 9, dielectric material deposited on substrate 107 is removed other than that associated with the dielectric standoff regions 905. Plasma ashing, among other methods, may be used to remove the dielectric material. In some embodiments, a dielectric removal process is used that terminates at the upper surface of the electrodes 126, providing for passivation of the electrode surfaces. In yet another embodiment, the etching process is terminated prior to exposure of the electrode layer, thereby providing additional passivation benefits to the electrodes on substrate 107.

As illustrated in FIG. 9, bonding surface 925 of substrate 105 is bonded to dielectric standoff regions 905 to form a composite substrate structure. As described more fully in the above reference applications, wafer bonding and thinning techniques are utilized to form the composite substrate structure. In particular, the composite substrate structure illustrated in FIG. 9 is formed using techniques with reduced alignment tolerances since the bonding surface 925 of substrate 105 is planar and standoff regions 905 are fabricated in contact with substrate 107. Comparing the spatial light modulator illustrated in FIG. 2 to that illustrated in FIG. 9, one may observe differences in the two illustrated structures. For example, in FIG. 2, the standoff structures 272 are associated with substrate 105 prior to formation of the bonded substrate structure. Standoff regions 272 are fabricated from substrate 105 and are preferably single crystal silicon. On the other hand, in FIG. 9, the standoff structures 905 are associated with substrate 107 prior to formation of the bonded substrate structure. As illustrated in FIG. 9, standoff regions 905 are deposited and patterned on substrate 107 and are preferably formed form a combination of dielectric and conductive materials.

Although the spatial light modulator illustrated in FIG. 9 includes a dielectric standoff region partially surrounding a conductive plug, this is not required by the present invention. Alternative embodiments utilize a solid dielectric standoff region coupled to the first substrate. After bonding of the upper substrate to the dielectric standoff regions, as described below, openings are created in the solid dielectric standoff regions that extend from the upper substrate to the bias electrodes coupled to substrate 107. Thus, some embodiments do not utilize the conductive plug illustrated in FIG. 9, rather forming an electrically conductive structure similar to that illustrated in FIGS. 4 and 5.

Figure 10:
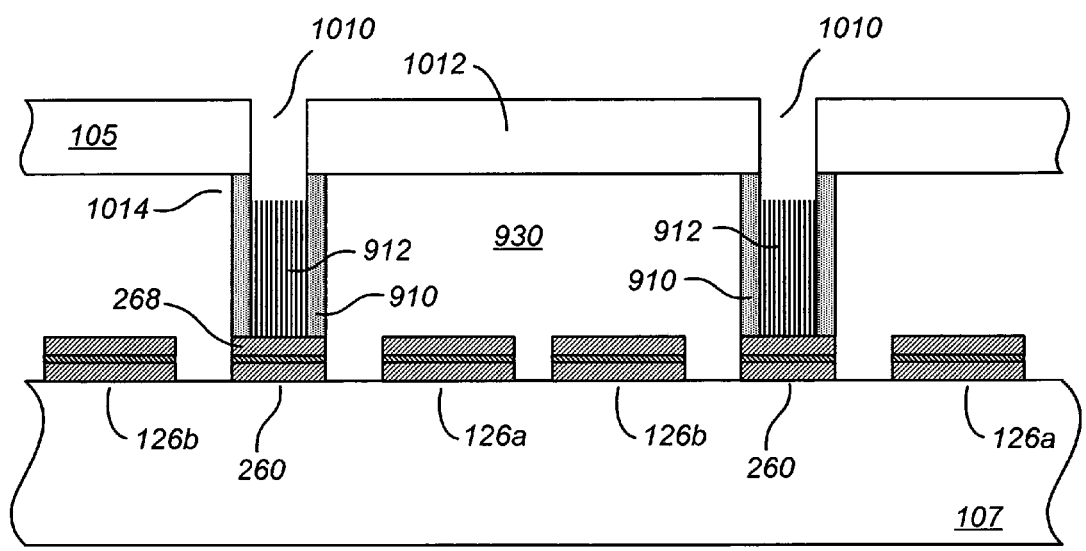

FIG. 10 is a simplified schematic illustration of a spatial light modulator according to one embodiment of the present invention at one stage of fabrication. Substrate 105 is patterned and etched to form openings 1010 passing through layer 1012 of substrate 105. In addition, the openings 1010 pass through a portion 1014 of the additional dielectric layer 914 illustrated in FIG. 9, exposing the upper surfaces of tungsten plugs 912. As illustrated in FIG. 10, the process used to form openings 1010 terminates at the top of the tungsten plugs 912 and provides vertical sidewalls for openings 1010.

Figure 11:
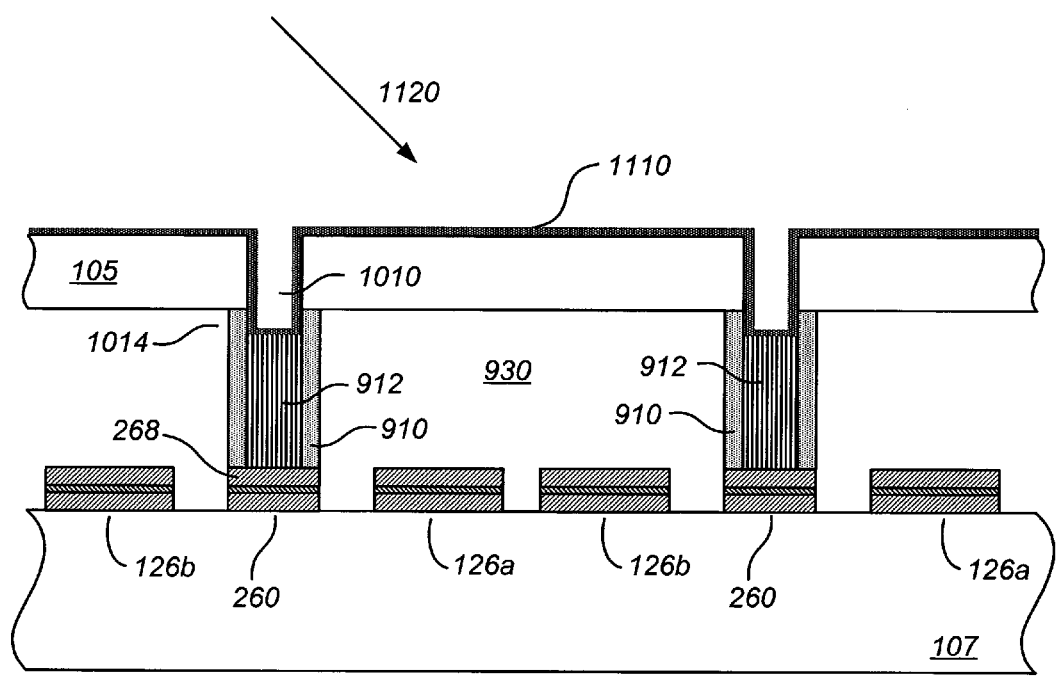

FIG. 11 is a simplified schematic illustrations of a spatial light modulator according to one embodiment of the present invention at a later stage of fabrication. At least one layer of material 1110 is deposited on the upper surface of substrate 105 and in openings 1010. In some embodiments of the present invention, the deposited material is able to conduct electricity and reflect optical radiation. In a particular embodiment, the material 1110 is a multi-layer stack of metals preferentially deposited on the surface of substrate 105 and in openings 1010. Preferably, the material 1110 is made of a deposited TiN layer and a deposited aluminum layer. For example, the TiN layer is 150 Å thick and the aluminum layer is 300 Å thick in a specific embodiment. In alternative embodiments according to the present invention, the thickness and composition of the deposited layer or layers of material 1110 is varied, utilizing other materials that conduct electricity and reflect light in the visible region.

As illustrated in FIG. 11, multi-layer stack 1110 provides a reflective coating on the upper surface of substrate 105. As described more fully below, portions of substrate 105 are processed to form micro-mirrors, which reflect light incident along line 1120. Thus, the upper portion of stack 1110 illustrated in FIG. 11, which includes an aluminum layer, provides a high reflectivity coating for the mirror surface suitable for reflecting incident radiation in the visible region. Moreover, since the multi-layer stack 1110 passes through insulating dielectric layer 1014, layer 1110 provides for electrical continuity between the mirrors formed in portions of substrate 105 and the bias electrodes 260. As illustrated in FIG. 11, layer 1110 and bias electrode 260 are coupled through the tungsten plug 912. In some embodiments of the present invention, the vertical extent of multi-layer stack 1110 is less than that associated with multi-layer stack 410 illustrated in FIGS. 4 and 5.

Semiconductor processing techniques suitable for enhancing the electrical contact between the upper surface of the tungsten plug 912 and conductive layer 1110 are well known to one of skill in the art, including plasma treatment after formation of openings 1010 and prior to deposition of layer 1110.

Figure 12:
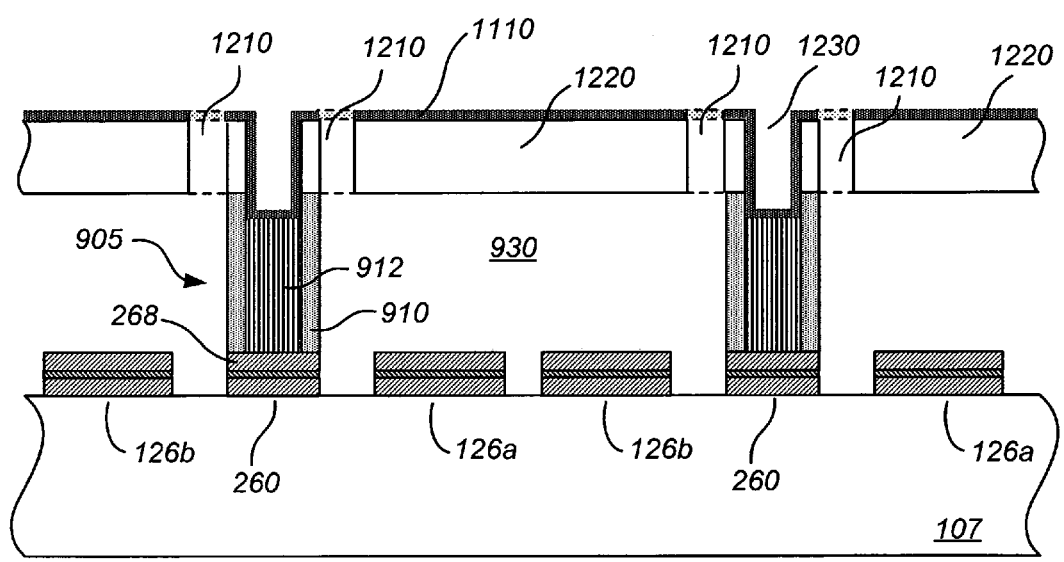

FIG. 12 is a simplified schematic illustration of a bonded substrate structure according to an embodiment of the present invention at the mirror release stage of processing. As illustrated, the upper substrate has been patterned and processed to form a number of openings 1210, creating a number of micro-mirrors 1220. Although FIG. 12 illustrates a cross-sectional view of the mirror structures, one of ordinary skill in the art will appreciate that a three-dimensional structure is represented by the figure. Openings 1210 are illustrated with a dashed line to represent the formation of hinges coupled to standoff regions 905 and open spaces between mirrors 1220 and standoff structure 905. Moreover, openings 1210 provide electrical continuity across multi-layer stack 1110, which provides for electrical connection between the mirrors 1220 and the bias electrodes 260. Top view illustrations of the bonded substrate structure illustrated in FIG. 12 are analogous to the top view illustration of FIG. 7. Of course, openings 1230 could be filled with additional conductive material as will be evident to one of skill in the art.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A spatial light modulator adapted to reflect incident light, the spatial light modulator comprising:
    a first substrate comprising a bias grid;
    a bias electrode array coupled to the first substrate and electrically coupled to the bias grid;
    a dielectric bond pad array coupled to the bias electrode array;
    a standoff region array coupled to the dielectric bond pad array, the standoff region array comprising a plurality of standoff regions;
    a plurality of mirror plates having an upper surface, the plurality of mirror plates flexibly coupled to the standoff region array; and
    an electrically conductive layer deposited on the upper surface of the plurality of mirror plates, an internal surface of the plurality of standoff regions, and a portion of the bias electrode array to electrically couple the plurality of mirror plates to the bias electrode array.

2. The spatial light modulator of claim 1 further comprising a reflective layer deposited on the electrically conductive layer.

3. The spatial light modulator of claim 2 wherein the electrically conductive layer and the reflective layer are deposited sequentially.

4. The spatial light modulator of claim 1 wherein the standoff region array comprises a layer of a single crystal silicon substrate.

5. The spatial light modulator of claim 1 wherein the standoff region array comprises one or more deposited dielectric layers.

6. The spatial light modulator of claim 5 further comprising a plurality of tungsten connectors partially surrounded by portions of the standoff region array and electrically coupled to the bias electrode array.

7. The spatial light modulator of claim 5 wherein the one or more deposited dielectric layers comprise materials selected from the group consisting of silicon dioxide, silicon nitride, and silicon oxynitride.

8. The spatial light modulator of claim 1 wherein the dielectric bond pad array comprises materials selected from the group consisting of silicon dioxide, silicon nitride, and silicon oxynitride.

9. The spatial light modulator of claim 1 wherein the bias electrode array comprises a multilayer stack including layers of titanium nitride, aluminum, and titanium nitride.

10. The spatial light modulator of claim 1 wherein the electrically conductive layer comprises a multilayer stack including layers of titanium nitride and aluminum.

* * * * *